US008724519B2

(12) United States Patent
Sergeev et al.

(10) Patent No.: US 8,724,519 B2
(45) Date of Patent: May 13, 2014

(54) TECHNIQUE FOR DUAL HOMING INTERCONNECTION BETWEEN COMMUNICATION NETWORKS (75) Inventors: Andrew Sergeev, Kfar-Sava (IL); Alexander Kugel, High Wycombe (GB); Gideon Agmon, Kfar-Sava (IL); Rotem Cohen, Nes-Ziona (IL)

(73) Assignee: ECI Telecom Ltd., Petach-Tikva (IL)

( * ) Notice: Subject to any disclaimer, the term of this patent is extended or adjusted under 35 U.S.C. 154(b) by 65 days.

(21) Appl. No.: 13/391,271

(22) PCT Filed: Aug. 9, 2010

(86) PCT No.: PCT/IL2010/000642
§ 371 (c)(1),
(2), (4) Date: Feb. 17, 2012

(87) PCT Pub. No.: WO2011/021179
PCT Pub. Date: Feb. 24, 2011

(65) Prior Publication Data
US 2012/0155484 A1 Jun. 21, 2012

(30) Foreign Application Priority Data
Aug. 20, 2009 (IL) .......................................... 200503

(51) Int. Cl.
*H04L 12/28* (2006.01)
(52) U.S. Cl.
USPC ............ 370/258; 370/249; 370/401; 370/404
(58) Field of Classification Search
USPC .......................... 370/258, 222, 249, 401, 404
See application file for complete search history.

(56) References Cited

U.S. PATENT DOCUMENTS

| 5,859,839 | A | * | 1/1999 | Ahlenius et al. | ............... 370/252 |
| 6,052,210 | A | * | 4/2000 | Nathan | ........................... 398/56 |
| 6,717,922 | B2 | * | 4/2004 | Kamat et al. | ................... 370/258 |
| 7,545,735 | B1 | * | 6/2009 | Shabtay et al. | ................ 370/217 |
| 8,320,282 | B2 | * | 11/2012 | Rollins | .......................... 370/258 |
| 2004/0218539 | A1 | * | 11/2004 | Anqud et al. | .................. 370/241 |
| 2007/0144870 | A1 | | 6/2007 | Nuppenau et al. | |
| 2008/0181196 | A1 | | 7/2008 | Regan et al. | |
| 2008/0219156 | A1 | | 9/2008 | Caviglia et al. | |
| 2008/0228943 | A1 | | 9/2008 | Balus et al. | |
| 2009/0109841 | A1 | * | 4/2009 | Nozaki et al. | ................. 370/218 |

(Continued)

FOREIGN PATENT DOCUMENTS

WO  WO 2007/144870  12/2007

OTHER PUBLICATIONS

International Search Report mailed Nov. 26, 2010, in International Application PCT/IL2010/000642, filed Aug. 9, 2010, including Written Opinion.

(Continued)

*Primary Examiner* — Ricky Ngo
*Assistant Examiner* — Dewanda Samuel
(74) *Attorney, Agent, or Firm* — Novick, Kim & Lee, PLLC; Harold L. Novick; Jae Youn Kim (57) ABSTRACT A dual homing technique for ensuring loop free transmission of traffic between telecommunication networks such as VPLS by utilizing a loop protocol in the dual homed connection. The technique also provides selective handling of VPLS data streams protected and non-protected by the dual homing loop protocol.

8 Claims, 6 Drawing Sheets (56) References Cited

U.S. PATENT DOCUMENTS

2009/0168647 A1 7/2009 Holness et al.
2009/0168671 A1* 7/2009 Holness et al. ............... 370/256
2009/0268609 A1* 10/2009 Koch et al. .................... 370/222
2009/0274155 A1 11/2009 Nakash

OTHER PUBLICATIONS

Jishnu, *G.8032 Dual Node Interconnect*, International Telecommunication Union, Nov. 2008; pp. 1-8.

* cited by examiner

TECHNIQUE FOR DUAL HOMING INTERCONNECTION BETWEEN COMMUNICATION NETWORKS

FIELD OF THE INVENTION

The present invention relates to a technology of dual home (dual node) interconnection between various communication networks, in particular the invention may be applied to pure Ethernet Layer 2 (L2) networks, VPLS networks or a combination there-between.

BACKGROUND OF THE INVENTION

The technique of dual home/dual homing interconnection of L2 communication networks was developed for providing protection to the traffic carried between the networks. The most important requirement to the dual homing techniques is preventing traffic duplication and traffic loops which might occur due to intrinsic redundancy of the dual homing configurations. Various solutions of the technique are presently known in the prior art.

U.S.2008219156A describes a communication network protection system made up of interconnected networks, at least one of which has an automatic control plane (for example ASTM) comprising terminal interconnecting nodes, termed primary nodes. Corresponding secondary terminal nodes are associated with the primary terminal, wherein a secondary terminal node is used to realize a protection circuit in case of failure of the associated primary node.

U.S.2009168647A discloses interworking of an Ethernet Ring network with an Ethernet network with traffic engineered trunks (PBT network), that enables traffic engineered trunks to be dual homed to the Ethernet ring network to enable for protection switching between active and backup trunk paths in the PBT network. In one embodiment, the active path will terminate at a first bridge node on the Ethernet ring network and the backup path will terminate at a second bridge node on the Ethernet ring network. Trunk state information is exchanged between the bridge nodes to enable the bridge nodes to determine which of the active and backup paths should be used to forward data on the trunk. Upon a change in trunk state, a flush message is transmitted on the Ethernet ring network to enable the nodes on the Ethernet ring network to relearn the path to the new responsible bridge node.

U.S.2009168671A, incorporated hereby by reference, proposes yet another approach to the dual homing technology. To enable an Ethernet ring to be dual homed into a spanning tree protocol controlled Ethernet network, spanning tree control packets (Bridged Protocol Data Units or BPDUs) are transported as data frames over the Ethernet ring. This allows the Ethernet ring to appear as a single link to the spanning tree protocol so that the spanning tree can extend over the link. However, since the spanning tree does not have visibility as to the internal structure of the ring, the spanning tree cannot block links on the Ethernet ring network. Conversely, BPDUs from the Ethernet ring are not transmitted into the Ethernet domain that is implementing the spanning tree, so that the spanning tree is not affected by the control mechanism in place on the Ethernet ring network. As mentioned in the U.S.2009168671A, Ethernet nodes that are interconnected in a closed loop architecture, may be allowed to collectively run a separate control plane to control how data is passed between the nodes in the ring. The control plane on the closed loop selects one of the nodes to be a root node to provide for blocking of traffic flowing on the ring. This prevents traffic from endlessly looping on the ring. Additionally, the control plane provides for failure detection on the closed loop, notification of the failure to the nodes of the closed loop, and how connectivity can be restored to enable the closed loop to recover from failure. One aspect of the control protocol is that, upon failure in the closed loop, a fault indication message will be transmitted on the ring. Contribution 59 of Tejas Networks Ltd. to Study Group 15 of the ITU Telecommunication Standardization Section (COM15-C93-E), dated November 2008, proposes an extension to G.8032 to address the dual node interconnection between two rings (wherein G.8032 is a Ring networks protection protocol of the ITU-T standard committee). The proposal of the contribution is to denote links connecting the two rings as a so-called Interconnect Ring (IR) and circulating via the Interconnect Ring R-APS (control, signaling) messages of the G.8032 protocol. The proposal of the contribution requires differentiation of the R-APS messages in various ring networks and in the IR ring.

The important drawback of the above-mentioned proposal and of the other discussed prior art solutions as well is that all nodes of the dual homing structure (IR ring in the case of the above-mentioned contribution) must actively exchange G.8032 messages there-between. In other words, the dual homing nodes belonging to different networks must all be enabled to actively utilize the G.8032 protocol. Such a requirement seriously limits possibilities of a local network operator, who considers providing a dual homing connection with a remote network, since a loop protocol cannot be ensured by the local facilities.

Another drawback of conventional dual homing techniques stems from their intrinsic feature to provide protection to traffic carried between two interconnected networks. Traffic that for any reason does not require protection, and/or traffic assigned to pass between the networks via a specified connection of the dual homing configuration, is likely to be dropped in case of a physical cut or a logical blocking of this specified connection.

U.S.2008181196A discloses aggregating links across so-called multiple chassis connection (MC-LAG). When an indication is received that some local links are to be aggregated with some links on another chassis, coordination with the other chassis is performed, via an inter-chassis control path, to present (to a downstream equipment) the local links and the links on the other chassis as an aggregated group of links. The MC-LAG principle is currently (though not widely) used for pure L2 Ethernet networks only. However, it is not applicable to VPLS networks.

OBJECT AND SUMMARY OF THE INVENTION

It is therefore the object of the present invention to provide a new, simpler dual homing technique, being capable of ensuring sufficient protection of traffic between the networks interconnected by a dual homing configuration and preventing traffic duplication/loops.

It is another object of the invention to provide such a dual homing technique which would be suitable and effective for VPLS networks.

The object can be achieved if the new dual homing technique will utilize a loop prevention protocol (e.g., multi chassis LAG or MC-LAG, RSTP or the like, Ethernet Ring Protection protocol such as G.8032 or the like, etc.) but will not require enabling all nodes of the configuration to actively support that protocol.

According to a first aspect of the invention, there is provided a dual homing connection (DH) for interconnecting a first and a second communication networks, the DH comprising three or four edge nodes (or Gateways, GW) divided into a first and a second groups of nodes (node groups) respectively residing in the first communication network and the second communication network, wherein the first node group comprises one or two nodes and the second node group comprises the remaining two or one nodes; said first node group and said second node group being interconnected by two bidirectional data communication paths for performing protected traffic transmission between the two networks, while all the nodes of the DH being interconnected by a ring-like path suitable for carrying control messages;
the dual homing connection utilizing a local, loop prevention protocol in such a manner that
only the first node group is enabled to actively utilize said loop prevention protocol by issuing and processing control messages of the protocol,
decisions of said protocol to utilize one or another of the bidirectional communication paths for said traffic transmission are made at the first node group and based on processing of the control messages being issued and/or received at the first node group.

In one embodiment of the DH, each of the node groups comprises two nodes, and the dual homing connection is a fully redundant configuration.

In another embodiment of the DH, one of the node groups comprises two nodes and the other—only one node, so that the dual homing connection has only partial redundancy.

The second node group is independent and does not actively support said protocol. The reasons may be various: it is not enabled, say due to the demarcation/lack of agreement between two different operators, it may not support any efficient DH protocol at all, etc.

Though, the node(s) of the second group are preferably transparent for control messages of the protocol (or do not participate in it at all), and such an embodiment will be discussed further in the description.

In the preferred embodiment, the first node group comprises two nodes interconnected by a first portion of the ring-like path (so-called "short portion", passing in the first communication network).

The local loop protocol run on the DH should be understood as a loop protocol instance deployed specifically on the DH.

In the most preferred embodiment, the loop protocol is G.8032 which is the simplest and most effective for the proposed solution.

The control messages (or protocol messages) are created based on physical layer failure/alarm indications, such as hardware triggers utilized for protection by other L2 loop prevention protocols: port triggers Loss of Signal, Port Up/Down, LF/RF, link OAM failures, service OAM or Tunnel OAM failures, etc. Control messages of G.8032 can be called PDUs protocol data units); they are also based on specific physical layer indications.

Actually, the ring-like path, suitable for carrying control messages (protocol messages) in both directions, is assumed to always exist in any dual homing connection. For carrying control messages such as PDU of G.8032 in VPLS networks, the ring-like path should be pre-provisioned as a group of pseudo-wires connecting nodes of the DH Preferably, the first node group (and only the first node group) comprises a root node (a master node) of the protocol. In one embodiment, the root node is capable of making said decisions based at least on the control messages issued at the first node group or received via the first portion of said ring-like path (i.e., via a "short" connection passing within the first network between nodes of the first node group). Actually, the decisions can be made based only on the control messages issued at a sole node (root node) of the first group. However, such a configuration with a sole node in the first group is not typical for the proposed solution.

In another preferred embodiment, the ring-like path serves for carrying the control messages, issued by the first node group, also via a second portion of the ring-like path, passing through the second node group, wherein
the second node group allows transparently transmitting there-through control messages of the protocol in both directions, whenever said control messages are issued by the first node group;
a root node in the first node group being capable of making decisions based on all control messages obtained at the first node group.

As mentioned in the background description, the loop prevention protocol G.8032 is usually utilized on ring networks. It is based on logically blocking traffic via one link in the ring (called Ring Protection Link RPL) by a root node responsible for performing the protocol, while requires bidirectional circulation of control messages (called control plane) along the ring. When a failure is detected in a ring network protected by the G.8032 protocol, one of the links in the ring becomes blocked (it may remain the previously blocked RPL, but may be another link), and the traffic flowing in the ring is rerouted via an alternative route. A suitable mechanism of MAC withdrawal, for effective flushing of MAC addresses in the network node(s) is always applied.

The loop prevention protocol, deployed in the proposed dual homing DH, in case of a failure in any element of the DH (i.e., in any element of the ring), should result in keeping at least one of the data communication paths alive. G.8032—an Ethernet Ring Protection protocol being the simplest and the most appropriate for preventing loops in ring-like configurations—is preferable to be run in the DH connection according to the present invention. It goes without saying that a suitable MAC withdrawal mechanism should also be applied to the DH connection.

The proposed dual home solution allows easily organizing traffic protection and loop prevention in a dual home configuration "just from the side of your own network". It can be done by a network provider by enabling the group (one node or a pair of edge nodes) of its own network to utilize, say, a G.8032-type protocol, while not bothering at all about deployment of the protocol to the opposite pair of edge nodes which are situated in a remote network. The preferred additional condition will be used then to ensure that the mentioned ring-like path connecting the pair of local edge nodes via the opposite (remote) pair of edge nodes, will become a tunnel transparently conveying there-through control messages in order to establish free circulation of the G.8032-type messages in the ring. It should be noted, however, that this additional condition is not always required; there may be a case where the tunnel transparently conveying control messages does not exist (for example, when the first node group—and only the first node group—comprises a root node/a master node of the protocol and the decisions are actually made based on the control messages issued at the sole/root node of the first group).

The first and the second communication networks may respectively utilize different, separate loop preventing protocols—for example, a ring protection protocol such as G.8032 and a mesh protection protocol such as STP or MSTP protocol.

According to a second aspect of the invention, there is also provided a method for establishing a loop-free dual homing interconnection DH between a first and a second communication networks using three or four nodes of the DH, wherein said three or four nodes are divided into two node groups, a first node group comprising one or two nodes residing in the first network and a second node group comprising the remaining two or one nodes residing in the second network, the method comprises:

ensuring interconnection of the first node group and the second node group by two bidirectional data communication paths for performing protected traffic transmission between the first and the second networks,     ensuring interconnection of all said nodes of the DH by a ring-like path suitable for carrying control messages (protocol messages),     deploying a loop protocol locally in said DH so that only the first node group be enabled to actively utilize the loop protocol by issuing and processing control messages of the protocol, and thereby, at the first node group, making decisions of said protocol about utilizing one or another of the bidirectional data communication paths for said traffic transmission, based on processing of the control messages being issued and/or received at the first node group.

Preferably, the method comprises selecting a root node of said protocol from the first node group residing in the first network, said root making the decisions.

Further preferably, the method comprises ensuring that the second node group transparently carries there-through control messages of the protocol, whenever issued by the first node group. To ensure transparent transmission of the control messages, regular steps can be taken, such as provisioning, at the second group of nodes, of communication tunnels (for example one or more pseudo wires PW, etc.) just for the control messages. According to the reservation mentioned above, there is another way which does not include such transparent carrying of messages at all.

In the second node group the protocol is not enabled actively, since that group belongs to another operator which, for example, is not aware of a newly installed DH protocol. Actually, the second node group may not support any DH protocol at all, if it is legacy equipment which was deployed before any efficient DH protocols appeared.

It should be noted that the proposed dual homing interconnection is advantageous for layer 2 Ethernet networks, and especially for SVLANs (Provider Service virtual Local Access Networks) or VPLS (virtual private LAN service domains). With VPLS, Ethernet packets arriving from an access network are encapsulated in a multi-protocol label switching (MPLS) format, based on which they are forwarded across a provider network toward the required remote sites. The use of MPLS enables optimal utilization of network resources, for example utilizing fast rerouting (FRR) and scalability. VPLS architecture implements full mesh connectivity between the provider edge nodes (PE) that connect the customer access networks, thus allowing communication of each access network with any other access network belonging to the same group of VPLS domains. Each PE-PE path carrying VPLS traffic is called a pseudo-wire (PW).

A modern advanced alternative to using Ethernet-VLAN for connecting different networks is classifying customer's traffic to specific SVLAN or VPLS instances (i.e., per service). With this method, known as Hierarchical VPLS (H-VPLS), Ethernet packets already arrive encapsulated with MPLS headers over the connection to the provider network. The connection for such classified traffic is a so-called spoke pseudo-wire (spoke PW).

Traffic between different VPLS domains may comprise various H-VPLS spoke PWs which usually require protection and obtain it in a dual home configuration(s) interconnecting VPLS domains. However, the mentioned inter-domain traffic may contain other traffic streams (for example, a non-H-VPLS stream such as a point to point pseudo-wire for a specific customer which does not require protection to that traffic). Such a non-protected traffic stream, when crossing a dual homing configuration between two networks, will be assigned by the network operator to only one specific data communication path in the dual homing configuration. Additionally, there may be present some inter-domain traffic which does not use the H-VPLS. That traffic may use alternative mechanisms for the protection, for example Fast Reroute (FRR). Therefore, if to that specific data communication path is eventually cut or logically blocked by a loop protocol running in the dual homing interconnection, all the data stream pre-provisioned at that path will be dropped.

The Inventors propose providing a dual-homing interconnection with the following capabilities: a) to distinguish data streams not protected by the loop protocol (for example, non-H-VPLS streams) from data streams protected by that protocol (for example, H-VPLS streams), assigned to and passing via one or another of the data communication paths and b) in case of an eventual logical blocking of a specific data communication path to which at least one of the "unprotected" data stream(s) is assigned, performing the blocking only for the "protected" data streams (which will then be transmitted via the alternative data communication path of the dual homing), while preserving unblocked other data streams.

The above solution is especially effective and advantageous for the VPLS networks interconnected by a DH connection, wherein the data streams are VPLS data streams (services). In one specific case, the protected data streams are H-VPLS data streams transmitted via H-VPLS spoke pseudo wires, and the unprotected data streams are non-H-VPLS data streams transmitted via non-H-VPLS pseudo wires. In this case, the G.8032 protocol can be selectively applied to Dual-Homed H-VPLS services streams only (H-VPLS spoke pseudo-wires or tunnels carrying spoke pseudo wires), thus leaving other services unaffected.

According to yet a further aspect of the invention, there is provided a dual homing technique (a dual homing connection and a method for loop free communication of data traffic via the dual homing connection between a first network and a second network). A node of such a DH, residing in a first network, is adapted to perform the following operations of the method:

to distinguish one or more "unprotected" VPLS data streams/tunnels, assigned to a physical port via which said node is connected to one of the data communication paths of the DH, from one or more "protected" VPLS data streams/tunnels assigned to the same physical port;

in case of logically blocking said physical port according to a loop protocol decision, to perform said logical blocking only for the "protected" one or more VPLS data streams (tunnels), while preserving unblocked said "unprotected" VPLS data streams, thereby maintaining communication of said unprotected VPLS data streams via the DH.

The term "unprotected/"non-protected" data streams should be understood here as data streams not protected by the loop protocol running on the DH. In the preferred version, these streams are "non-HVPLS" streams. Such "unprotected" streams may effectively use other protection methods such as FRR, 1:1 LSP protection, etc.

Similarly, the "protected" streams are those protected by the DH protocol.

To improve condition of one or more said "unprotected" data streams (non-HVPLS streams or streams just not-protected by the DH protocol) assigned to be carried via one specific data communication path out of the two said data communication paths in the dual homing interconnection, the method preferably comprises the following preliminary step:

provisioning for said one or more "unprotected" data streams one or more tunnels via said specific data communication path, being logically separate from tunnels provided for protected data streams;

thereby, in case of logically blocking said specific data communication path, performing blocking only the tunnels of the "protected" data streams, while preserving unblocked the one or more tunnels provisioned for said "unprotected" data streams.

The above-mentioned discrimination between the protected traffic paths and non-protected traffic paths by differently handling thereof at DH nodes may be introduced as an additional improvement/modification into a loop protocol being run in the DH connection, for example into G.8032 protocol.

According to yet another aspect of the invention, there is provided a software product comprising computer implementable instructions and data stored on a suitable computer readable medium; the software product, when being run in a processor of a node of the described dual homing connection (DH), is capable of enabling operations of the above-defined method, or namely:

establishing a loop protocol in the DH and actively utilizing it at least at said node becoming a root node in the first node group;

issuing control messages of the protocol at least by said root node (and said another node if exists in the first node group);

receiving, recognizing and handling the control messages according to the protocol only at the first node group, namely by said root node.

Additionally, there is provided a second software product intended to be used in a node of a DH connection; the second software product comprising computer implementable instructions and data storable on a suitable computer readable medium; when being run in a processor of the node the software product being capable of enabling the following operations:

distinguishing one or more unprotected data streams, assigned to a physical port via which said node is connected to an opposite node of the DH, residing in an opposite network, from one or more protected data streams assigned to the same physical port;

wherein the protected data streams being streams protected by a loop protocol deployed on the DH, while the unprotected data streams being streams not protected by a loop protocol deployed on the DH;

logically blocking or unblocking said physical port according to the loop protocol decision, wherein in case the decision is to logically block said physical port, performing said logical blocking only for the protected one or more data streams, while preserving unblocked said unprotected data streams.

It has been declared by the Inventors that the first node group (i.e., one or two nodes enabled to utilize the loop protocol) is capable of maintaining the protocol in the ring-like path, and of performing necessary functions of the protocol, provided that some modifications are introduced in fault scenarios of the protocol. In particular, the above relates to a G.8032 protocol.

How the G.8032-like protocol is modified/adjusted to achieve the purposes of the invention, will be demonstrated in the detailed description.

BRIEF DESCRIPTION OF THE DRAWINGS

The invention will be further described in detail and illustrated with reference to the following non-limiting drawings in which:

FIGS. 3a, 3b, 3c illustrate three embodiments of the proposed DH configuration, where FIG. 3a shows a fully redundant DH, and FIGS. 3b and 3c—two partially redundant DHs.

DETAILED DESCRIPTION OF THE PREFERRED EMBODIMENTS

Figure 1:
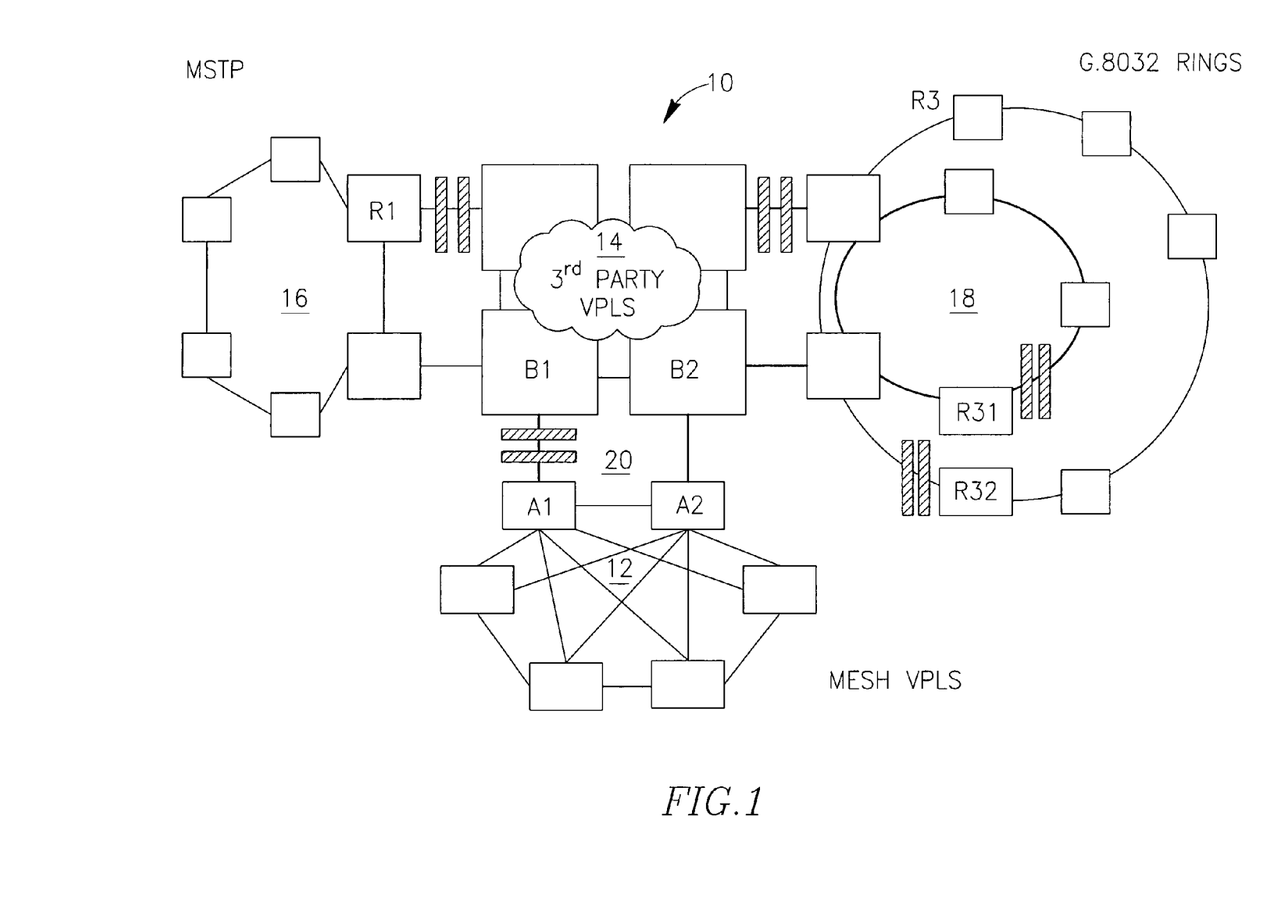
FIG. 1 illustrates a multi domain network comprising various access networks interconnected using a dual homing technique.

FIG. 1 illustrates an example of a multi-domain network 10 comprising a local access network 12 (say, a mesh VPLS network), a third party network 14 being an VPLS network, a ring-like MSTP network 16 and a number of ring networks 18 which can be protected by G.8032 protocol. Network 12 is interconnected with network 14 via a dual homing configuration A1, A2, B1, B2 (schematically marked 20) where nodes (gateways, GWs) A1 and A2 belong to network 12. They can be called a first nodes group. Nodes (GWs) B1, B2 of 20 belong to network 14 and can be called a second nodes group. Other networks are interconnected with the network 14 in a similar manner.

FIG. 1 shows that each of the ring networks 18, protected by G.8032, comprises a root node (R31, R32) which keeps open (logically blocked for data traffic) one of the links connected to the root node. The open links are called Ring Protection Links (RPL) and are schematically marked with two parallel thick hatched lines symbolizing the logical cut/block.

According to the invention, the ring-like connection formed between nodes A1, A2, B1, B2 of the dual homing configuration 20 can also be protected by a modified loop preventing protocol (G.8032 in this example). The logically blocked RPL link A1 B1 is marked accordingly.

Figure 2:
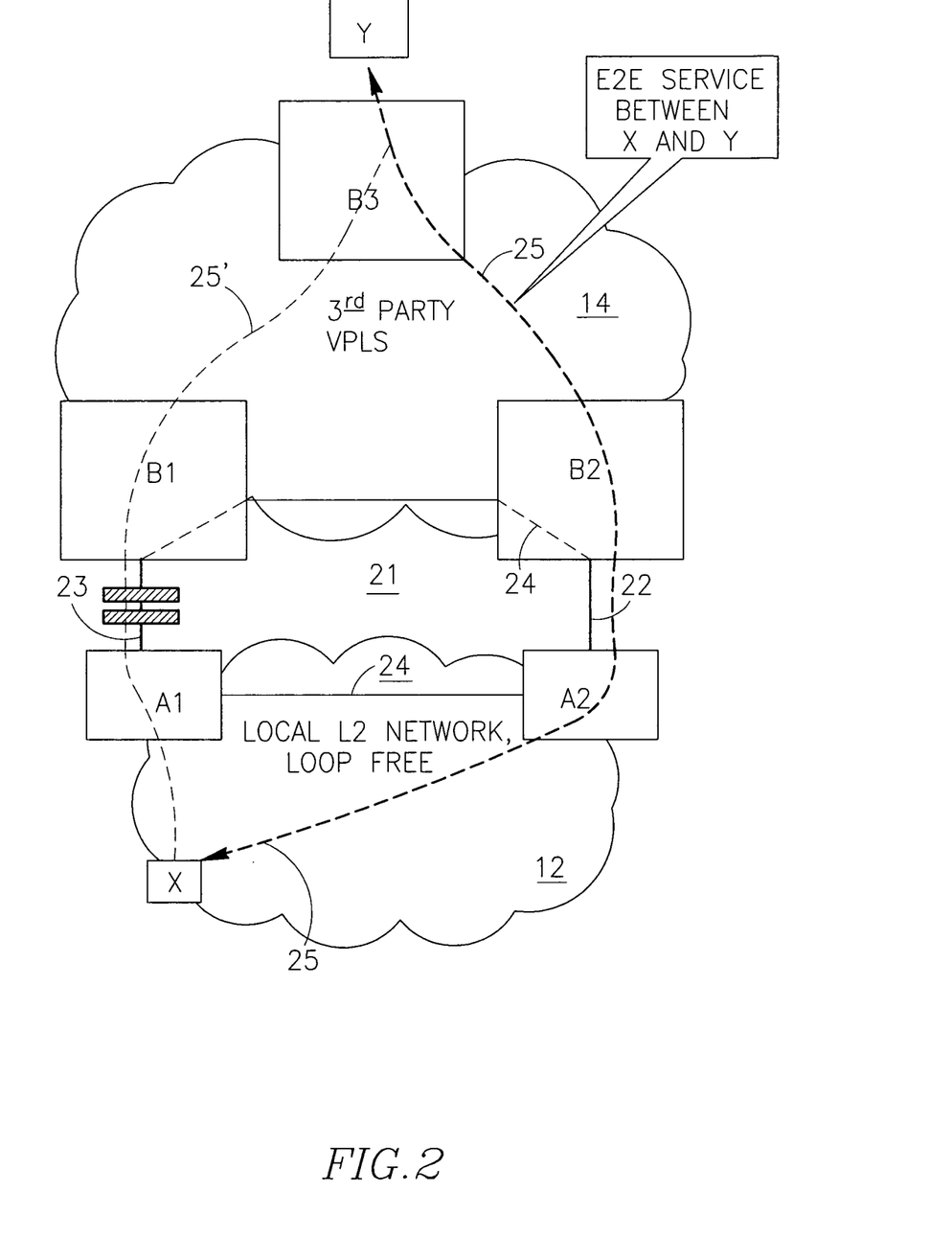
FIG. 2 illustrates one embodiment of the proposed dual homing configuration (DH) interconnecting communication networks and providing protection to an exemplary traffic stream carried between the networks.

FIG. 2 schematically illustrates one possible configuration a dual connection 20 of FIG. 1, and how it is managed in order to facilitate interconnection between multiple domain networks. The dual homing configuration (DH) 21 of FIG. 2 forms two data communication paths 22 and 23 which serve for protecting traffic to be carried between networks 12 and 14. In other words, only one of the paths 22, 23 should work at a time in the DH configuration 21.

The dual homing configuration 21 runs a loop prevention G.8032 protocol instance on nodes A1, A2 and comprises two protocol-enabled Gateway nodes A1 and A2 residing in the local network 12, while nodes B1, B2 residing in a remote VPLS network 14 must not be and are not protocol enabled in this example. The first nodes group A1, A2 is connected to the second nodes group B1, B2 via a ring-like path 24 which transparently passes via the nodes B1 and B2 (i.e., nodes B1, B2 are passive and do not issue or process control messages of the protocol). To the contrary, nodes A1 and A2 issue control messages of the G.8032 protocol, and node A1 being the root node assigned by the protocol, performs processing of the control messages received by the A1 at both its sides (along two opposite directions of the ring-like path A1-B1-B2-A2).

Node A1 is defined as a root node (ring master) which is responsible for processing control messages. One of the data communication paths (in this case, link 23) must always be blocked for data traffic by the ring master A1 (i.e., the ring protection link RPL is one of the data communication paths). The data traffic stream marked 25 between node X of network 12 and a remote node Y beyond network 14 will be therefore carried via the non-blocked link 22 of the dual homing configuration 21.

It should be noted, however, that link 23 is a part of the ring-like path 24 which is suitable for carrying control messages; link 23 is therefore non-blocked, transparent for control messages of the protocol.

Status of links incoming node A1 are detected by node A1, using physical layer local indications/alarms; based on the indications; control messages are created (marked SF, signal failure). Status of links incoming node A2 are forwarded by node A2 to node A1 and are detected by A1 as control messages reflecting remote alarms (marked R-SF, remote-SF). Therefore, in this configuration, information on failure in elements of the dual homing configuration will become known to the root node A1 both via a short portion (A1-A2) and via a long portion (A1-B1-B2-A2) of the ring-like path 24; if the long portion does not exist, failure in element of the dual homing configuration will become known to the root node A1 via the short portion. There is also a case where this portion is "long", meaning it traverse node A3 (which transparently carries control messages between A1 and A2). If the A1-A2 portion is "long", OAM protocol (such as service OAM, tunnel OAM or the control messages itself) will indicate the status of the node A1 to A2 and vice versa.

The information will be processed at the root node, and a reconfiguring action will be initiated if so decided. For example, in case of failure in the link 22 or any of the nodes A2 or B2, the data traffic stream 25 will be rerouted via link 23 which will be unblocked. The rerouted data traffic is shown as data stream 25'.

The dual homing configuration may be fully redundant (as 20 or 21, comprising four gateway nodes), and partially redundant (which comprises only three nodes, two at one network and one at the opposite network).

Figure 3A:
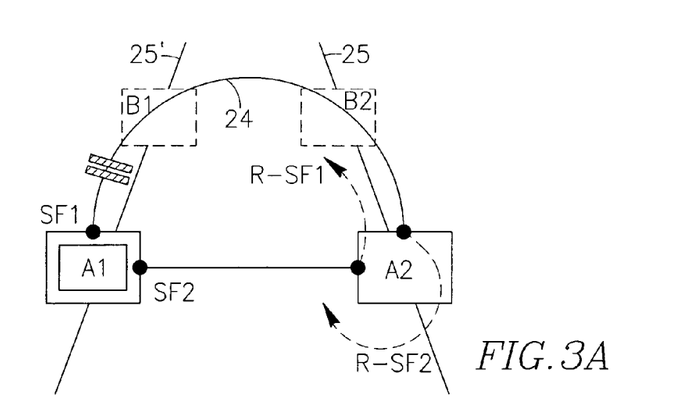

FIG. 3a illustrates which events can be analyzed by A1 in the fully redundant dual homing configuration.

Node A1 is double framed—it is a loop protocol enabled root/master node. Nodes B1, B2 are not protocol-enabled and thus are schematically illustrated as dotted contours not affecting control messages in the bidirectional ring-like path 24.

The physical ports where local fault indications are detected by the protocol-enabled nodes are shown as black rings on the nodes' sides. A1 can detect its "local" physical layer faults/alarms coded by control messages SF (signal failure):

SF1—no signal from the side of B1, indicating failure on the unidirectional link B1-A1 or on B1;

SF2—no signal from the side of A2, indicating failure on the unidirectional link A2-A1 or on A2;

A2 can detect its local alarms and sends control messages R-SF (remote signal failure) about these alarms to A1, using non-failed sections of the ring-like path 24:

R-SF1—no signal from the side of A1, indicates failure on the unidirectional link A1-A2 or on A1;

R-SF2—no signal from the side of B2, indicates failure on unidirectional link B2-A1 or on B2;

By processing a current combination of the control messages, the root/master node decides which of the data transmission paths 25 or 25' will be selected (see Table 1 below in the description for examples of the combinations and the decisions).

It should be noted, however, that even if the two nodes A1 and A2 utilize only the short bidirectional portion A1-A2 of the ring-like path, the root node will be able to logically derive its decisions from the control messages of the protocol it is still able to obtain. For example, an indication that the physical port is down may be used to trigger the SF1 or SF2 states. The list of such triggers may include, LF/RF defects of the port, Link OAM failures, etc.

Table 1 below presents control messages (signal failure indications) for a fully redundant DH configuration shown in FIG. 3a, and reactions of the protocol to specific combinations of the control messages.

TABLE 1

| SF1 | SF2 | R-SF1 | R-SF2 | Decimal | Actions | Failures |
|---|---|---|---|---|---|---|
| 0 | 0 | 0 | 0 | 0 | None | |
| 0 | 0 | 0 | 1 | 1 | None | |
| 0 | 0 | 1 | 0 | 2 | Unblock | B2 or Link to B2 failure |
| 0 | 0 | 1 | 1 | 3 | Invalid | |
| 0 | 1 | 0 | 0 | 4 | Unblock | Failure of A2 or both ring portions deadlure |
| 0 | 1 | 0 | 1 | 5 | None | No loop formed still |
| 0 | 1 | 1 | 0 | 6 | Unblock | B2 or Link to B2 failure |
| 0 | 1 | 1 | 1 | 7 | Unblock | B2 or Link to B2 failure |
| 1 | 0 | 0 | 0 | 8 | None | |
| 1 | 0 | 0 | 1 | 9 | None | |
| 1 | 0 | 1 | 0 | 10 | None - double fault not handled | |
| 1 | 0 | 1 | 1 | 11 | Invalid | |
| 1 | 1 | 0 | 0 | 12 | None | |
| 1 | 1 | 0 | 1 | 13 | Invalid | |
| 1 | 1 | 1 | 0 | 14 | Invalid | |
| 1 | 1 | 1 | 1 | 15 | Invalid | |

Table 1 presents, in the accumulated form, how the modified loop preventing protocol interprets various combinations of control messages, if received at the root node in the proposed dual homing configuration via two connections (a long and a short) between protocol-enabled nodes A1, A2.

In the table, the term "none" means no reaction, the term "unblock" means logical unblocking of the previously blocked link A1-B1 for data traffic, and the term "invalid" indicates an impossible combination of the control messages.

Figure 3B:
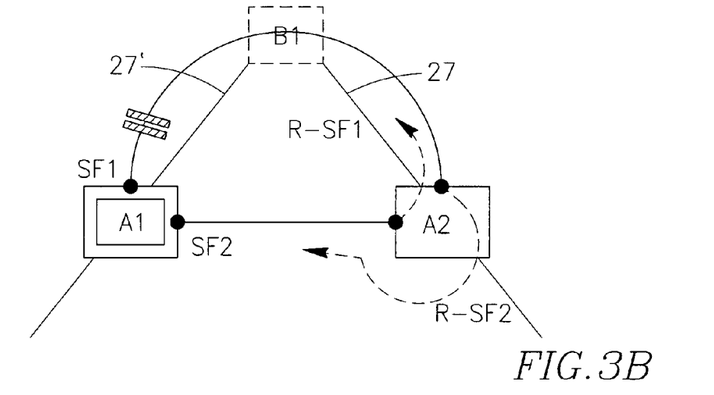
Figure 3C:
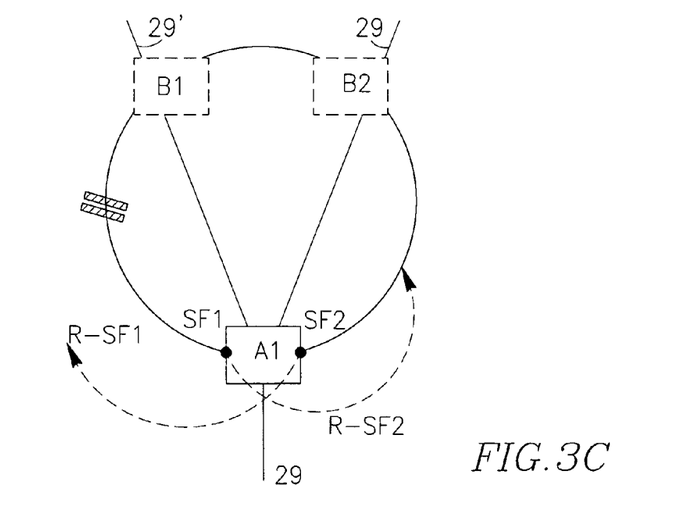

FIGS. 3b and 3c illustrate how control messages are created and forwarded in two partially redundant DH modifications. FIG. 3b illustrates a partially redundant DH configuration where only one node B1 is "loop protocol-disabled". Traffic via such a configuration is shown as data traffic streams 27 and 27'. As above, the root node A1 will be able to make its decisions even based only on the information detected or issued by itself and on the information received from A2 via the short connection A1-A2 (i.e., without utilizing the "long" portion of the ring-like path passing via node B1). As above, an indication that the physical port is down may be used to trigger the SF1 or SF2 states. The list of indications may include LF/RF defects of the port, Link OAM failures, etc.

FIG. 3c illustrates a case where there is only one protocol enabled Gateway node A1 which detects its own local alarms, issues its own control messages and may also interpret remote alarms/indications created by itself. Actually, the root node A1 is able to make decisions itself, without utilizing the bypass via the remaining two "dumb" nodes B1, B2 of the DH configuration. Traffic via such a DH configuration is shown as data streams 29 and 29; the A1 node decides which of them should be used, based just on fault indications and control messages created at its ports. Similarly to the above-described cases, a faulty physical port causes signal failure states SF1 or SF2. Other physical or OAM triggers can be used.

The proposed protocol still works, though the case of FIG. 3 may be not typical.

FIG. 4 comprise comments about possible reasons of some combinations of the control messages.

FIGS. 4a-4i illustrate various locations of faults in a fully redundant DH, which are interpreted by the deployed loop protocol (in this example, by G.8032) in the following way:

FIGS. 4a-4d show failures which, according to the deployed protocol and similarly to the conventional G.8032, do not result in any changes in the fully redundant dual homing configuration. The responsibility is not transferred from node A1 to node A2, the data traffic is kept via the non-blocked data transmission path A2-B2, and the initially blocked data transmission path A1-B1 remains blocked.

Figure 4A:
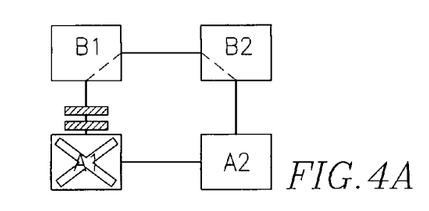
FIGS. 4a-4i illustrate how the modified protocol reacts to failures in different specific elements of the proposed dual homing configuration (fully redundant four node embodiment).
Figure 4B:
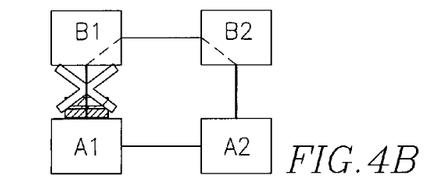
Figure 4C:
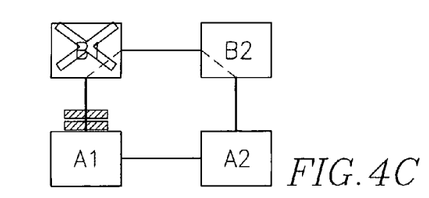
Figure 4D:
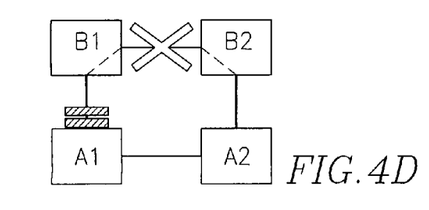
Figure 4E:
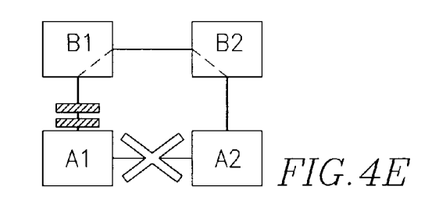

FIG. 4e—according to the conventional G.8032, upon the indicated failure in link A1-A2, the link A1-B1 should be unblocked. However, according to the modified protocol, we do not do anything and the traffic is maintained via the link A2-B2.

Figure 4F:
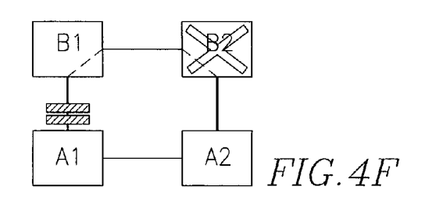
Figure 4G:
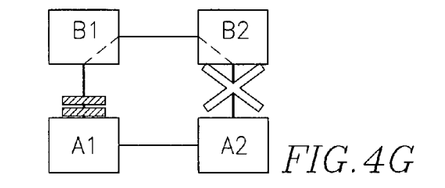
Figure 4H:
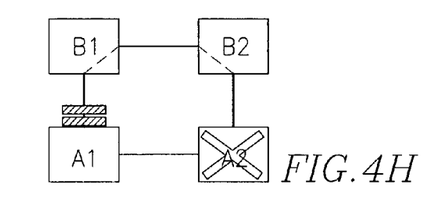

FIGS. 4f-4h illustrate faults related to the presently functioning data communication path A2-B2. Such failures result in unblocking the alternative link A1-B1.

Figure 4I:
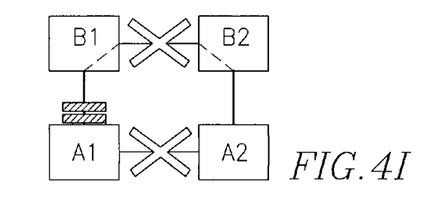

FIG. 4i illustrates one case of a double failure which may result in the same action—unblocking the link A1-B1. However, double faults are usually not considered as having low probability.

Figure 5:
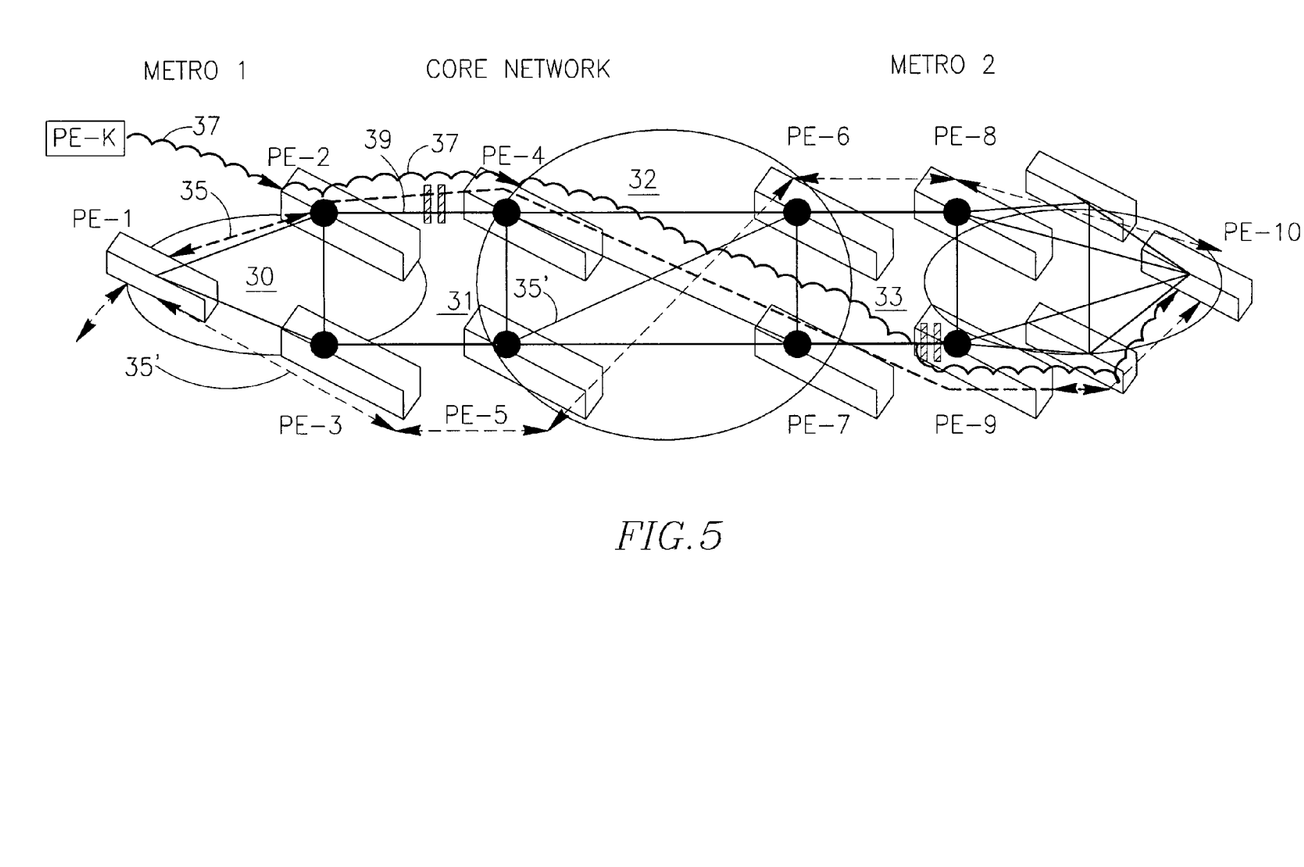
FIG. 5 illustrates an example of three networks interconnected via dual homing configurations which carry therethrough two different types of traffic between the networks.

FIG. 5 illustrates an example of communication networks 30, 32, 34 interconnected via two DH configurations: 31 and 33. A traffic stream 35 (such as H-VPLS spoke PW-1), protected by an alternatively provisioned traffic stream 35', is transmitted from a node PE-1 via the network 30, and then via the dual homing 31 to the network 32 and so further. It should be noted that the dual homing connection DH 31 is preferably the DH where only one group of nodes (say, PE2-PE3) are loop protocol enabled, though all the DH nodes may be protocol-enabled and actively utilize the loop protocol. In the specific DH 31, traffic stream 35 is protected by the protocol G.8032 which always allows selecting one of the provisioned copies: 35 or 35' for forwarding to the core network 32 (and back).

Simultaneously, there exists another, unprotected by the G.8032 data stream (routed, say, along a non H-VPLS Pseudo Wire from a node PE-K, and shown by a waved line 37) which passes via the network 30 and then via one of the data transmission paths (39) of the DH configuration 31 to which it is assigned.

Let us suppose that the path 39 (link PE2-PE4 comprising all provisioned data traffic tunnels or pseudo wires) is eventually blocked (shown in FIG. 5 as the hatched sign of logical block) by the loop protection protocol which is run over the ring-like contour created in the DH configuration 31.

The traffic stream 35' will not be affected by the above event, since it is protected by the G.8032: in case its main path 35 is blocked in the DH connection 31 and all the data will be forwarded via the stream 35' on alternative link PE3-PE5 of the DH connection.

According to the conventional G.8032, the unprotected data traffic stream 37 would be dropped, since blockage of the link PE2-PE4 would mean blocking of all VPLS data traffic via that link (i.e., via the suitable pseudo wires at the nodes PE2, PE4). The proposed modified protocol resolves the above problem in VPLS networks by differentiating the traffic not protected by the G.8032 from the protected traffic at the corresponding pseudo wires at the node PE2 and PE4.

Figure 6:
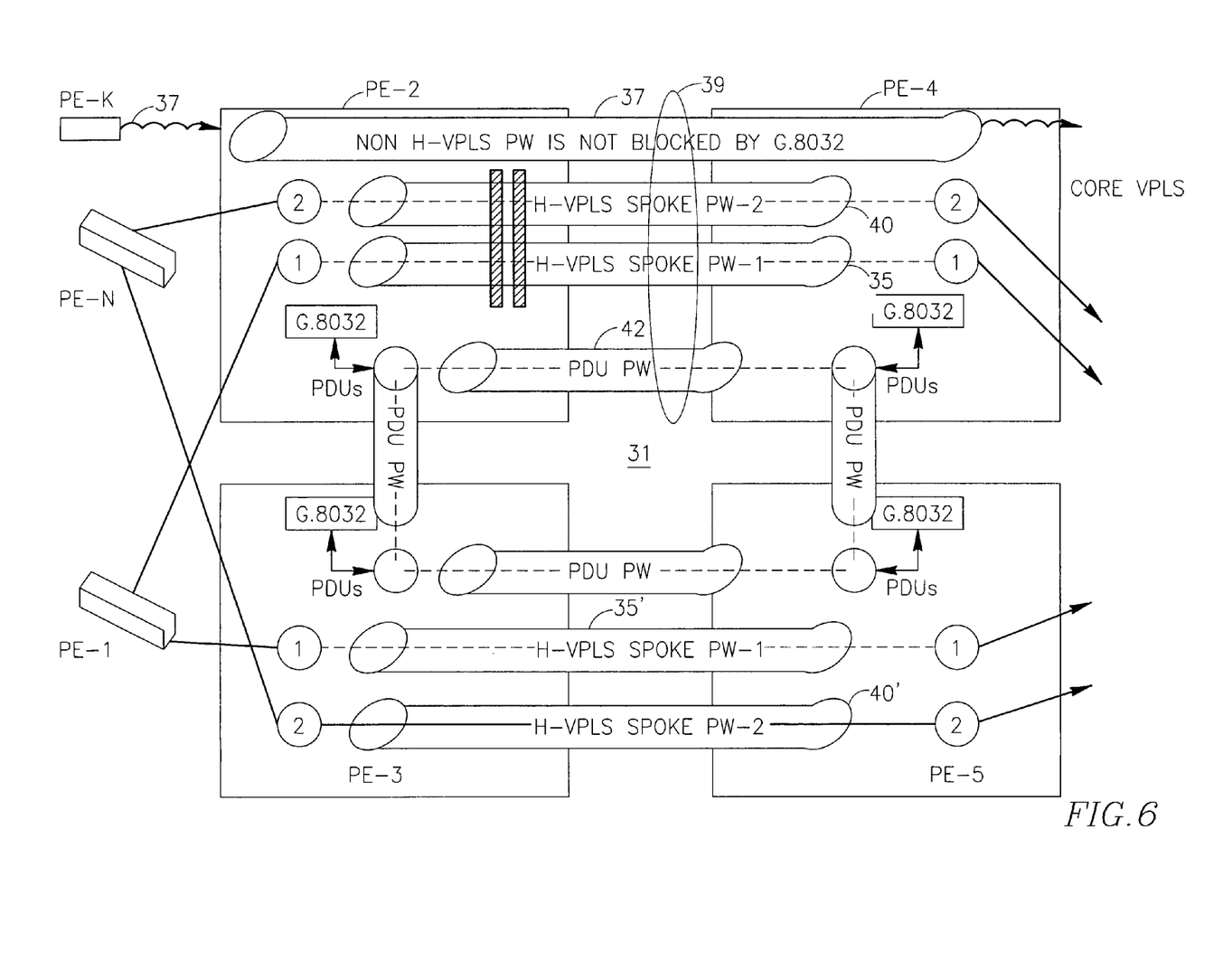
FIG. 6 illustrates an enlarged schematic view of the dual homing interconnection PE2-PE3-PE4-PE5 of FIG. 5, depicting how various traffic streams are treated by the proposed DH.

FIG. 6 illustrates the enlarged schematic view of the DH configuration 31 intended for interconnecting VPLS networks.

In this example, node PE-2 carries through the DH 31 two H-VPLS traffic streams/pseudo wires 35 and 40 protected by the G.8032 protocol. The stream 35 (protected by stream 35') arrives to the DH 31 via node PE-1, and the stream 40 (protected by stream 40') comes from a node PE-N.

The non-H-VPLS traffic data stream 37, via a suitable non-H-VPLS pseudo wire 37 arrives to the DH 31 from the node PE-K.

The node PE-2 being a root node according to the G.8032 protocol deployed on the ring-like contour connecting the DH nodes, performs the following operations on the link PE2-PE4 (comprising the plurality of pseudo wires which carry various types of communication via the link):

1. Blocks data traffic passing via the pseudo wires assigned to the protected data streams (35, 40).

This may be achieved by two possible ways:
a) blocking of all the relevant PWs, per service
b) blocking of the relevant tunnels, which are used for the transport of the DH protected streams Blocking the relevant tunnels may be preferred, since it is a more scalable and a faster method. Indeed, in Dual H Homed VPLS interconnections most of the PWs are transported though a limited number of tunnels.

It should be kept in mind that the blocking of tunnels does not block the tunnel OAM messages, thus allowing to monitor the status of the blocked tunnels prior to their re-activation.

2. Does not block control messages (PDU—protocol data units) of the G.8032 protocol, circulating in a tunnel 42 formed by four pseudo wires PW between four nodes of the DH 31. PDUs are generated in PE2 and are sent through dedicated PWs.

3. Does not block data traffic at pseudo wires/tunnels assigned to data streams such as 37, not protected by G.8032. That is performed according to the proposed method of applying the modified G.8032 (or the like) protocol to DH in VPLS networks.

The unprotected data traffic routed via the DH connection will be thus maintained without dropping it logically, and only a physical cut of the link between PE-2 and PE-4 will be able to affect that traffic.

It should be appreciated that other modifications of the DH connection and other versions of the proposed method may be suggested and should be considered part of the invention as far as defined by the general claims which follow.

The invention claimed is:

1. A dual homing connection DH for interconnecting a first and a second communication networks, the DH comprising three or four edge nodes divided into a first and a second groups of nodes, node groups, respectively residing in the first communication network and the second communication network, wherein the first node group comprises one or two nodes and the second node group comprises the remaining two or one nodes; said first node group and said second node group being interconnected by two bidirectional data communication paths for performing protected traffic transmission between the two networks, while all the nodes of the DH being interconnected by a ring-like path suitable for carrying control messages;

the dual homing connection utilizing a local loop protocol, being G.8032 protocol, in such a manner that only the first node group is enabled to actively utilize said loop protocol by issuing and processing control messages of the protocol, decisions of said protocol to utilize one or another of the bidirectional communication paths for said traffic transmission are made at the first node group and based on processing of said control messages being issued and/or received at the first node group only, thereby said local loop protocol being deployed and utilized only at the first node group of the DH, separately and independently from deploying any loop protocol at the second node group, wherein said first and second networks are VPLS networks, and wherein at least one node of the first node group is adapted to distinguish one or more unprotected VPLS data streams, assigned to a physical port via which said node is connected to an opposite node of the DH residing in a second network, from one or more protected VPLS data streams assigned to the same physical port;

in case of logically blocking said physical port according to the protocol decision, to perform said logical blocking only for the protected one or more VPLS data streams, while preserving unblocked said unprotected VPLS data streams; and wherein said protected data streams are data streams protected by the loop protocol, and said unprotected data streams are data streams not protected by the loop protocol.

2. The DH connection according to claim 1, wherein the first node group comprises a root node of the protocol, the root node making said decisions based at least on the control messages issued at the first node group or received via the first portion of said ring-like path passing between nodes of the first node group.

3. The DH connection according to claim 2, wherein the ring-like path serves for carrying the control messages, issued by the first node group, also via a second portion of the ring-like path, passing through the second node group, wherein the second node group allows transparently transmitting there-through control messages of the protocol in both directions, whenever said control messages are issued by the first node group;

a root node in the first node group being capable of making decisions based on all control messages obtained at the first node group.

4. A method for establishing a loop-free dual homing interconnection DH between a first and a second communication networks using three or four nodes of the DH, wherein said three or four nodes are divided into two node groups, a first node group comprising one or two nodes residing in the first network and a second node group comprising the remaining two or one nodes residing in the second network, the method comprising:

ensuring interconnection of the first node group and the second node group by two bidirectional data communication paths for performing protected traffic transmission between the first and the second networks;

ensuring interconnection of all said nodes of the DH by a ring-like path suitable for carrying control messages;

deploying a loop protocol, being G.8032 protocol, in said DH so that only the first node group be enabled to actively utilize the loop protocol by issuing and processing control messages of the protocol, without taking care about deploying the protocol at the second node group and thereby, at the first node group; and making decisions of said protocol about utilizing one or another of the bidirectional data communication paths for said traffic transmission, based on processing of said control messages being issued and/or received at the first node group only, wherein said first and second networks are VPLS networks and wherein the method comprises additional operations performed at least at one node of the first node group and forming part of said protocol:

distinguishing one or more unprotected VPLS data streams, assigned to a physical port via which said node is connected to one of the data communication paths, from one or more protected VPLS data streams assigned to the same physical port; and when logically blocking said physical port according to the protocol decision, performing said logical blocking only for the protected one or more VPLS data streams, while preserving unblocked said unprotected VPLS data streams, thereby maintaining communication of said unprotected VPLS data streams via the DH, and wherein said protected data streams are data streams protected by the loop protocol, and said unprotected data streams are data streams not protected by the loop protocol.

5. The method according to claim 4, wherein the method comprises selecting a root node of said protocol from the first node group residing in the first network, for making the decisions.

6. The method according to claim 4, further comprising the following preliminary step: provisioning for said one or more unprotected data streams one or more tunnels via said specific data communication path, being logically separate from tunnels provided for the protected data streams.

7. A method for establishing a loop-free dual homing interconnection DH between a first and a second communication networks using three or four nodes of the DH, wherein said three or four nodes are divided into two node groups, a first node group comprising one or two nodes residing in the first network and a second node group comprising the remaining two or one nodes residing in the second network, the method comprising:

ensuring interconnection of the first node group and the second node group by two bidirectional data communication paths for performing protected traffic transmission between the first and the second networks;

ensuring interconnection of all said nodes of the DH by a ring-like path suitable for carrying control messages;

deploying a loop protocol, being G.8032 protocol, in said DH so that only the first node group be enabled to actively utilize the loop protocol by issuing and processing control messages of the protocol, without taking care about deploying the protocol at the second node group and thereby, at the first node group; and making decisions of said protocol about utilizing one or another of the bidirectional data communication paths for said traffic transmission, based on processing of said control messages being issued and/or received at the first node group only, wherein said unprotected VPLS data streams are H-VPLS services passing via the DH, and the method comprises selectively applying said loop protocol to the said H-VPLS services only, thus leaving unaffected other services passing via the DH.

8. A non-transitory computer-readable storage media storing computer implementable instructions and data which, when executed, cause a processor of a node of a dual homing connection DH, to perform the method according to claim 4.

* * * * *